(12) United States Patent
Singh

(10) Patent No.: US 6,259,931 B1
(45) Date of Patent: Jul. 10, 2001

(54) CONTROLLING A COMMUNICATION DEVICE WITH DUAL-MODE TELECOMMUNICATIONS SIGNALING

(75) Inventor: Mona Singh, Cary, NC (US)

(73) Assignee: Ericsson Inc., NC (US)

( * ) Notice: Subject to any disclaimer, the term of this patent is extended or adjusted under 35 U.S.C. 154(b) by 0 days.

(21) Appl. No.: 09/134,460

(22) Filed: Aug. 14, 1998

(51) Int. Cl.$^7$ .................................................. H04B 1/38
(52) U.S. Cl. ........................... 455/553; 455/575; 455/566; 455/550
(58) Field of Search ............................... 455/566, 553, 455/575, 552, 465, 550, 554, 555, 466, 426; 379/354

(56) References Cited

U.S. PATENT DOCUMENTS

| | | | |
|---|---|---|---|
| 5,127,042 | * 6/1992 | Gillig et al. | 455/7 |
| 5,465,401 | * 11/1995 | Thompson | 455/90 |
| 5,497,507 | * 3/1996 | Komaki | 455/127 |
| 5,796,338 | * 8/1998 | Mardirossian | 340/568 |

* cited by examiner

*Primary Examiner*—Daniel Hunter
*Assistant Examiner*—Lana Le

(57) ABSTRACT

A communications device for use in a communications network has a control system configured to transmit signaling to and through the communications network in either of a first or a second mode. The user interface is configured to receive user input to select the signaling mode.

12 Claims, 4 Drawing Sheets

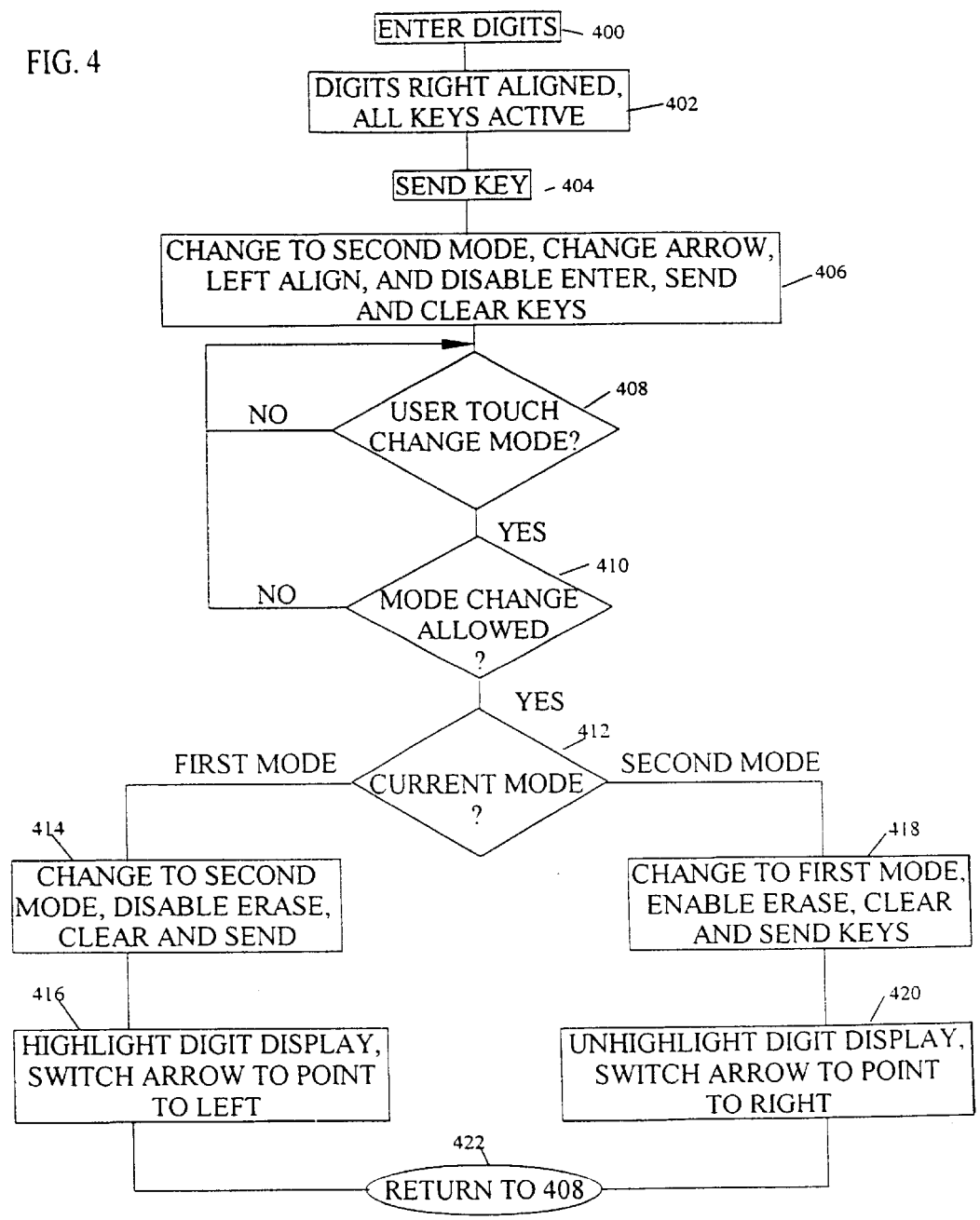

CONTROLLING A COMMUNICATION DEVICE WITH DUAL-MODE TELECOMMUNICATIONS SIGNALING

FIELD OF THE INVENTION

This invention relates to the field of telecommunication signaling, and more specifically, to a telecommunication device that communicates with and through a telecommunications network by signaling messages and by dual-tone, multi-frequency signaling.

BACKGROUND OF THE INVENTION

Communication devices of the present are capable of as many functions as communications devices from science fiction of the past. As communication moves from desk or wall telephones to cellular phones, voice paging and personal communication systems (better known as PCS), the shrinking size of communications devices coupled with the increase in functionality requires very small, multi-functional controls. As a result, there may be confusion as to how to operate these devices.

One area of confusion is signaling; specifically, how to set up a call and how to send further signaling tones through the network once the call is set up. Users are used to one paradigm for a dual-tone, multi-frequency (DTMF) or A touch-tones signaling (referred to herein as DTMF mode or DTMF signaling). Most anyone can use a DTMF keypad to generate signaling that performs tasks as diverse as dialing a telephone number to registering for classes and banking. DTMF signaling presumes that a pair of tones is generated for each key or button pushed and, once the key is pushed, the signal it represents cannot be changed. Call routing menu systems are examples of systems that expect one button, immediate generation of DTMF signaling in this paradigm.

Wireless telephones (also called cell phones, mobile stations and mobile telephones) use a different signaling paradigm. In this paradigm, the user enters digits, which are usually displayed on a screen, and then the user presses a "send" or "enter" key to send the digits into the network as a message. Commonly, there is a "backspace" or "erase" key that permits the user to change one or more entered digits, and a "clear" key to remove all entered digits before the signaling message is sent. This form of signaling will be referred to herein as "dialed digit" or "DD" mode. Once the signaling message is sent, some wireless telephones then cue to a DTMF mode, wherein the user may send DTMF signals through the telecommunication network to perform tasks such as banking, etc.

In the dual mode telephones that have two paradigms operating at any given time, however, it is not always clear to the user operating the telephone which mode a communication device is in (DTMF or DD), and the user cannot control the mode. Furthermore, there are times in the DTMF mode when it is desirable to be able to correct digits before they are sent into the network (i.e., when entering a string of digits representing a credit card number). Consequently, users of new communication devices can easily be confused by the two different signaling paradigms.

SUMMARY OF THE INVENTION

In one aspect of this invention, a communications device is provided for use in a communications network having a control system configured to transmit signaling to and through the communications network in either of a first or a second mode. The user interface is configured to receive user input to select the signaling mode. According to another aspect of this invention, the first mode comprises transmitting signaling messages. According to a different aspect of this invention, the control system transmits signaling in the first mode comprises as either signaling messages or as a plurality of dual-tone, multi frequency (DTMF) signals. In accordance with another aspect of this invention, the control system transmits signaling in the second mode as individual DTMF signals.

According to another aspect of the invention, the user interface includes a number pad, and the control system is configured to receive a number from the number pad and generate a DTMF tone corresponding to the number when the control system is in the second mode. According to another aspect of this invention, the number pad comprises a display of a telephone keypad on a touchscreen.

According to a different aspect of this invention, a method is provided for controlling a communication device having a plurality of input buttons including at least a send button and a plurality of digit buttons. The method comprises collecting digits responsive to digit buttons being pressed and sending the collected digits in a message responsive to the send button being pressed. Thereafter digits are sent as dual-tone, multi-frequency (DTMF) signals in a first mode, wherein digits are transmitted as DTMF tones as digit buttons are pressed, and a second mode wherein digits are collected as said digit buttons are pressed and transmitted as a series of DTMF tones responsive to a send button. The mode is switchable from the first mode to the second mode responsive to user input.

According to a further aspect of this invention, the communication device includes a display displaying a mode indication and a plurality of entered digits, and, when the communications device is in the first mode, the display indicates the first mode and right justifies the entered digits. According to yet another aspect of this invention, the display also displays a mode indication and a plurality of entered digits, and, when the communication device is in the second mode, the display indicates the mode and left justifies the entered digits.

A further aspect of this invention provides a communication device that uses signaling messages and DTMF signaling to communicate with and through a telecommunication network. The communications device includes a control system including a memory and a user interface to accept user signaling input and commands, wherein the control system is configured to operate in a first mode and a second mode. The control system comprises a processor that is responsive in the first mode to store user signaling input in the memory and send the signal responsive to user command and is responsive in the second mode to send DTMF signals into the telecommunication network as they are entered. The processor is also configured to switch between the first and the second mode responsive to user input.

According to another aspect of this invention, the processor includes an editor for changing signals before they are sent. According to a further aspect of this invention, the user interface includes a plurality of numbered keys in the form of a keypad, a send key and a backspace key, and wherein the send and backspace keys are inoperable in the second mode.

BRIEF DESCRIPTION OF THE DRAWINGS

A more complete understanding of this invention may be obtained from a consideration of the following detailed description in conjunction with the drawings, in which:

FIG. 4 is a flow chart of operation of the control interface of FIG. 1 according to an exemplary embodiment of this invention.

DETAILED DESCRIPTION

Figure 1:
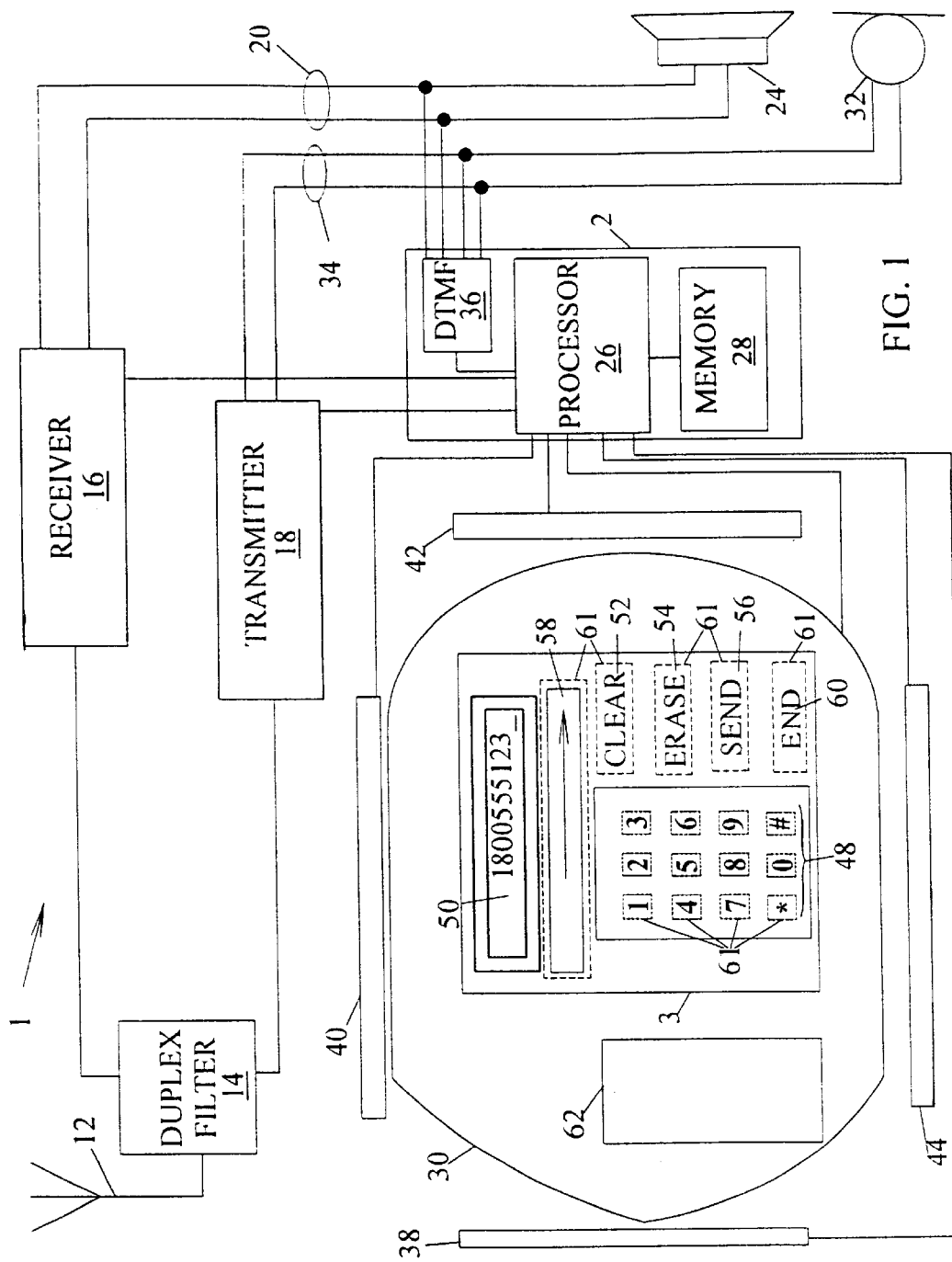
FIG. 1 is a block diagram of a wireless telephone having a control interface according to an exemplary embodiment of this invention which can be placed in different modes.

A personal communication system (PCS) is shown generally at 1 that utilizes a control system 2 and user interface 3 according to this invention. While this invention is illustrated herein in the context of a wireless telephone operating in a wireless network, the applicability of this invention is not so limited. This invention could be used, for example, in a digital wireline telephone that can communicate in two modes, such as an ISDN telephone.

PCS 1 includes an antenna 12 for sending and receiving radio signals between itself and a wireless network. Antenna 12 is connected to duplex filter 14, which enables receiver 16 and transmitter 18 to receive and broadcast (respectively) on the same antenna 12. Receiver 16 demodulates, demultiplexes and decodes radio signals into one or more channels. Such channels include a control channel and a traffic channel for speech or data. Speech is delivered over analog lines 20 to speaker 24. Data is delivered to a connector or to processor 26 in control system 2 when, for example, PSC 1 receives faxes.

Receiver 16 delivers messages from the control channel to processor 26. Control system includes processor 26, which controls and coordinates the functioning of PCS 1 responsive to messages on the control channel using programs and data stored in memory 28, so that PCS 1 can operate within a wireless network. Control system 2 further includes a dual-tone, multi frequency (DTMF) generator/receiver 36 that generates the full range of tones used in telephony. Of course, processor 26 may generate the tones itself, or some other multipurpose device may generate the DTMF tones. Processor 26 in control system 2 also controls the operation of PCS 1 responsive to input from user interface 3. User interface 3 has a touchscreen system 30 in this exemplary embodiment, as will be described further, below.

Microphone 32 receives speech signal input, converts the input into analog electrical signals and delivers the analog electrical signals over lines 34 to transmitter 18. Transmitter 18 converts the analog electrical signals into digital data, encodes the data with error detection and correction information and multiplexes this data with control messages from processor 26. Transmitter 18 modulates this combined data stream and broadcasts the resultant radio signals to the wireless network through duplex filter 14 and antenna 12. Processor 26 controls touchscreen 30 using programs and data stored in memory 28.

Control system 2 controls touchscreen 30, causing it to display symbols, icons and pictures, as is known in the art. Vertical transducer 38 and horizontal transducer 40 emit optical or audio waves to vertical receiver 42 and horizontal receiver 44, respectively. A finger touch on touchscreen 30 interrupts the wave flow, whereby processor 26 determines the location of the touch based on the coordinates reported by receivers 42 and 44, as is known in the art. Thus, processor 26 displays various icons on the screen, and takes action depending on the coordinates of the touched area.

According to this exemplary embodiment of this invention, control system 2 displays a number pad in the form of key pad 48, a dialed number display 50, and operational keys such as "clear" 52, "erase" 54, "send" 56, "switch mode" 58 and "end" 60. Dashed line boxes 61 denote areas that are touch-responsive. Area 62 can display, for example, text of faxes, directory numbers, or other pictures, icons or text.

When PCS 1 is initially turned on, processor 26 initializes the user interface 3 according to this exemplary embodiment of this invention in a first, or DD mode. In this first mode, PCS 1 collects any entered digits, such as digits for a des on telephone number, from touch keypad 48 and stores the digits in memory 28 of the control system 3. The digits entered are displayed on digit display 50 right justified, as is currently done in the art of wireless telephones. If the user touches "erase" 54, the last digit on the display is erased. When "send" 56 is touched, processor 26 sends a call setup message, including the stored digits, as is known in the art. Additionally, according to this invention, the signaling mode changes to a second, or DTMF, mode.

In the second mode, the control system 2 moves the dialed digits to the left side of digit display 50 (left justified). Additionally, when any of the digits on keypad 48 is touched, processor 26 causes DTMF unit 36 to immediately generate and transmit the tone pair universally recognized as being associated with that digit. "Clear" 52, "erase" 54 and "send" 56 displays are dimmed to indicate that these areas are not functional. It is desirable to disable certain keys, such as 52, 54 and 56 when they have no functionality in a particular mode. Therefore, the processor 26 does not recognize a touch imparted on any of the dimmed, non-functional keys. If the user touches "end" 60, the control process according to this invention changes back to the first mode.

Further, the user may want to enter a string of number to be sent as DTMF digits, but wants to be sure that the digit string is accurate before being sent (as in sending a credit card number). According to this exemplary end when the user is on a call, "switch mode" 58 is active, and the user may touch this area to change manually back to the first mode. The "erase" and "send" areas indicate that they are active again, and the digits on the display 50 are right justified again. In the first mode, the user enters and erases digits, which are stored by processor 26 until the user touches the "send" area. Processor 26 then causes DTMF unit 36 to generate the stored series of digits. The user may then either toggle "switch mode" 58 again, or the system may automatically change back to the second mode.

Figure 2:
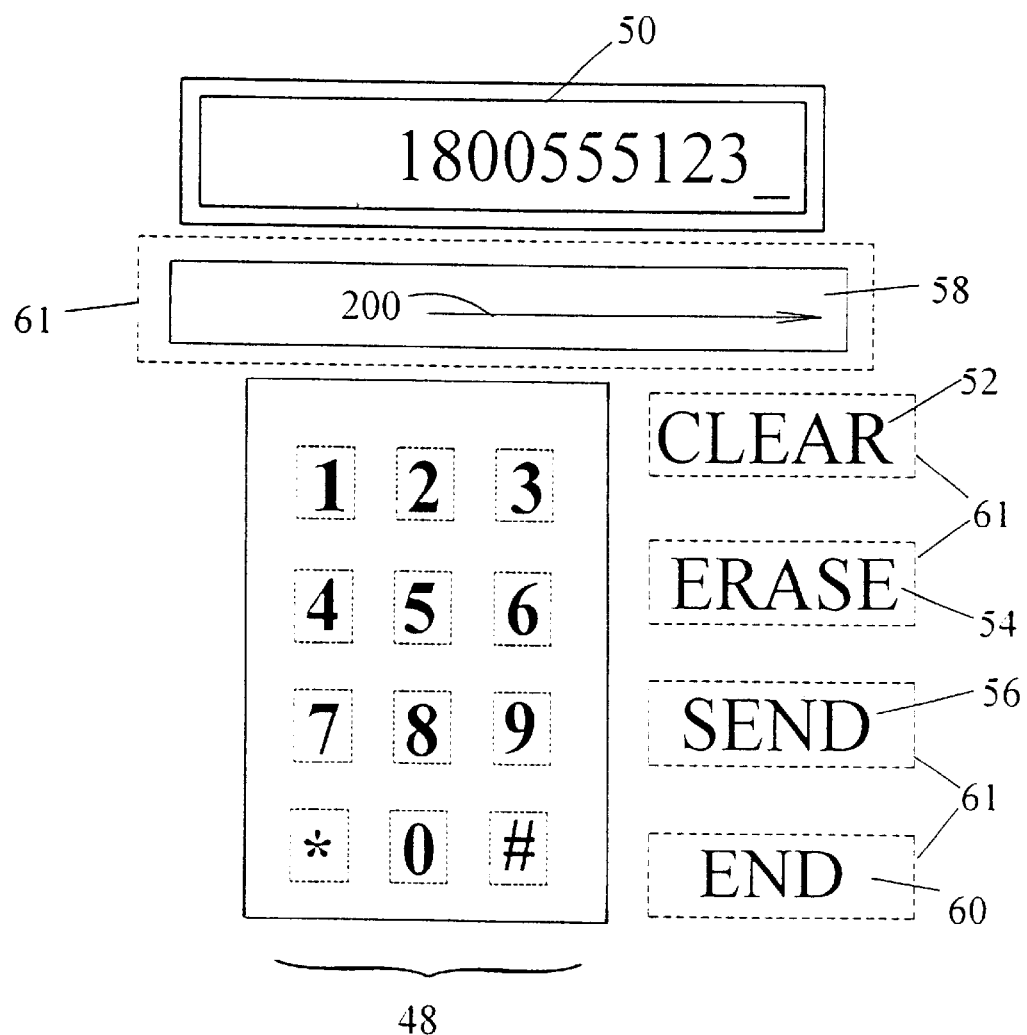
FIG. 2 is an example of the control interface of FIG. 1 in a first mode.

Turning to FIG. 2, a user interface 3 according to this invention is illustrated in the first or DD mode. The display is right justified, and "clear" 52, "erase" 54 and "send" 56 are active, as indicated by the presence of dashed line boxes 61. The "switch mode" box 50 is also active, as indicated by dashed line box 61. An arrow icon 200 in the "switch mode" box 50 graphically indicates the current mode by indicating that the digits are right justified. Of course, other icons or text may be used to indicate the mode.

Figure 3:
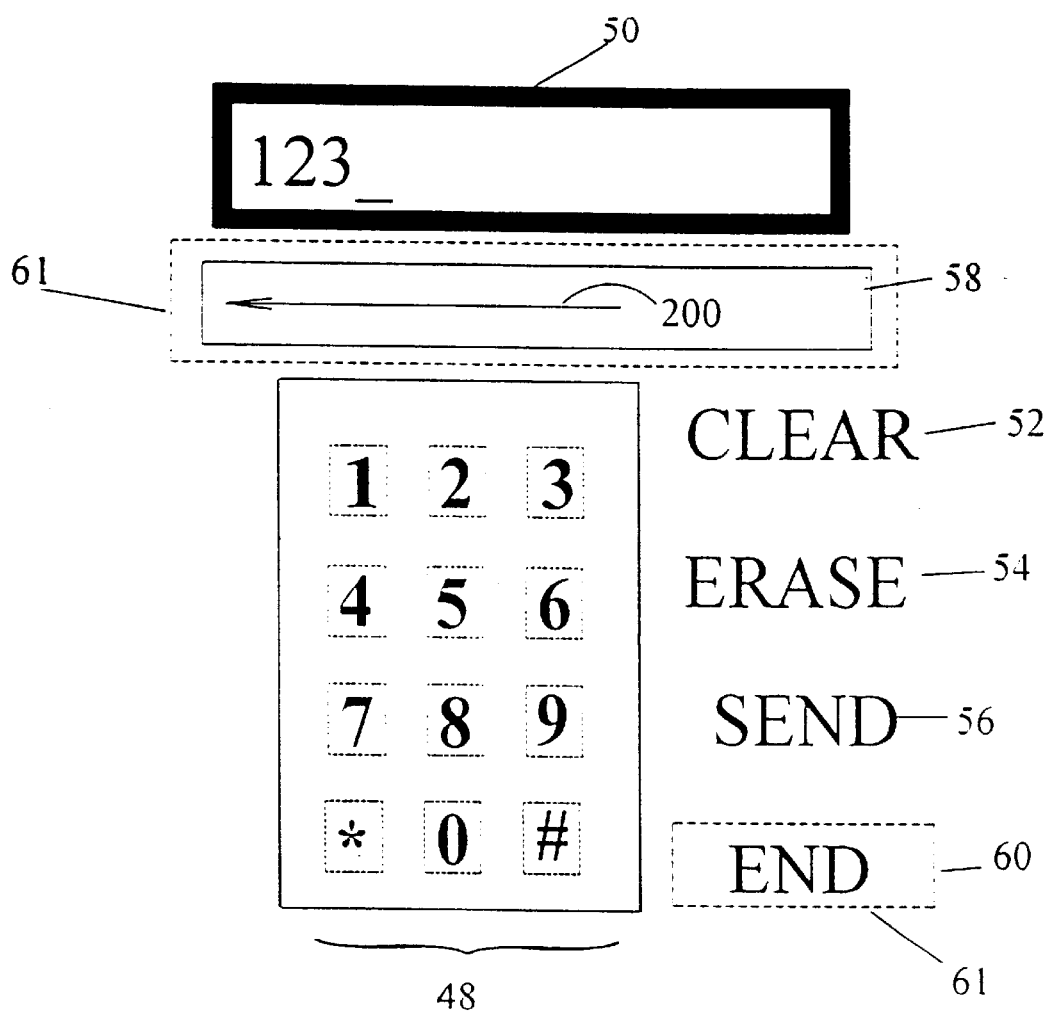
FIG. 3 is an example of the control interface of FIG. 1 in a second mode.

In FIG. 3, a user interface 3 according to this invention is illustrated in the second or DTMF mode. This screen illustrates that digit display 50 is highlighted, left justified, and "switch mode" 58 and "end" 60 are active, but "clear" 52 "erase" 54 and "send" 56 are not, as indicated by the absence of dashed line boxes. The arrow icon 200 points to the left in this figure, indicating that digits are left justified, and that the current mode is the second or DTMF mode.

FIG. 4 illustrates a flow chart of processing for control system 2 according to the exemplary embodiment of this invention. Processing starts in box 400, where digits are entered into the user interface 3 of PCS 1. In box 402, the digits appear in a non-highlighted display 50, right justified and all buttons 52, 54, 56, 58 and 60 are active. The user then touches "send" 56 in box 404 which causes, in box 406, the mode to change from the first mode (DD) to the second mode (DTMF). In the second mode, the digits appear in a highlighted display 50, left justified and the "send" 56 and "erase" 54 keys are dimmed, as described above. Processing continues to decision diamond 408, where a determination is made whether the user touched the "switch mode" area 58. If not, processing waits until the "switch mode" area is touched.

After the "switch mode" area 58 is touched, processing continues to decision diamond 410, where a determination is made whether switching mode is allowed. If switching mode is not allowed, then processing loops back to decision diamond 408. If switching mode is allowed, then processing proceeds to decision diamond 412, where a determination is made as to which mode the control system is in. If it is in the first mode, then processing proceeds to action box 414, where the mode is changed to the second mode, wherein the display is left justified, and "clear" 52 "erase" 54 and "send" 56 are disabled. Processing continues to action box 416, where the digit display 58 is highlighted and the arrow icon 200 is switched to point to the left, meaning second or DTMF mode. Processing then moves to oval 422, where it loops back to decision diamond 408.

If, in decision diamond 412, the mode is determined to be the second mode, then processing proceeds to action box 420, where the mode is changed to the first mode (DD), the digit display is left justified and "clear" 52, "erase" 54 and "send" 56 are activated. Processing then moves to box 420, where the digit display 50 is unhighlighted and the arrow icon 200 is changed to point to the right meaning that the first mode is the active mode. Processing proceeds to oval 422, and then loops back to decision diamond 408.

It is to be understood that the above-described embodiment is to illustrate the principles of this invention, and that those skilled in the art may devise many variations without departing from the scope of the invention. It is, therefore, intended that such variations be included within the scope of the appended claims.

What is claimed is:

1. A communications device for use in a communications network, said communications device comprising:
   a control system configured to selectively transmit signaling to the communications network in a first mode and a second mode, after a call has been set up between the device and the communications network the control system being configured in the first mode to collect a plurality of user signals as they are input into the communications device and to send the collected plurality of user signals as a series of dual-tone, multi-frequency signals in response to a user command, the control system being configured in the second mode to send each of a plurality of user signals as a dual-tone, multi-frequency signal as each of the plurality of user signals is input into the communications device; and
   a user interface configured to receive a user command to switch the control system between the first and second modes.

2. The communications device of claim 1 wherein the user interface comprises a number pad, and wherein the control system is configured to receive a number from said number pad and generate a dual-tone multi-frequency signal corresponding to said number when said control system is in said second mode.

3. The communications device of claim 2 wherein said number pad comprises a display of a keypad on a touchscreen.

4. A method for controlling a communication device having a plurality of input buttons including at least a send button, a switch mode button and a plurality of digit buttons, said method comprising:
   collecting digits responsive to said digit buttons being pressed and sending said collected digits in a call set up message responsive to a send button being pressed; and thereafter sending digits as dual-tone, multi-frequency (DTMF) signals in a first mode as said digit buttons are pressed, or
   sending digits in a second mode wherein said digits are collected as said digit button are pressed and transmitted as a series of DTMF tones responsive to said send button, and
   switching between the first mode and the second mode responsive to a switch mode button.

5. The method of claim 4 wherein said communication device includes a display displaying a mode indication and a plurality of entered digits wherein when said communication device is in said first mode, said display indices said first mode and right justifies said entered digits.

6. The method of claim 4 wherein said communication device includes a display displaying a mode indication and a plurality of entered digits, wherein when said communication device is in said second mode, said display indicates said mode and left justifies said entered digits.

7. A communications device that uses dual-tone, multi-frequency (DTMF) signaling to communicate with a telecommunication network, the communications device comprising:
   a control system comprising a memory and a processor, the control system configured to operate in a first mode and a second mode; and
   a user interface to provide user input to said control system and accept user signaling input and commands, wherein with the control system in the first mode the processor stores a first plurality of user signaling inputs in said memory and sends said stored first plurality of user signaling inputs as a series of DTMF signals in response to a user command, and with the control system in the second mode the processor sends a second plurality of user signaling inputs each as a DTMF signal as each of the second plurality of user signaling inputs is entered by a user; and
   the processor is further responsive to a user command to change between the first mode and the second mode after a call has been set up between the communications device and the communications network.

8. The communications device of claim 7 wherein said processor includes an editor responsive to user commands for changing said signals before they are sent.

9. The communications device of claim 7 wherein said user interface comprises a plurality of numbered keys, a send key and a backspace key, and wherein said send key and said backspace key are inoperable in said second mode.

10. The communications device of claim 9 wherein said user interface further includes a touchscreen device, wherein said plurality of numbered keys comprise a plurality of locations on said touchscreen device.

11. The communications device of claim 7 wherein said user interface comprises a keypad.

12. The communications device of claim 7 further comprising a display for displaying entered signaling, said display including means for right justifying displayed signaling when said control system is in said first mode and means for left justifying displayed signaling when said control system is in said second mode.

* * * * *

UNITED STATES PATENT AND TRADEMARK OFFICE
CERTIFICATE OF CORRECTION

PATENT NO. : 6,259,931 B1
DATED : July 10, 2001
INVENTOR(S) : Mona Singh

Page 1 of 1

It is certified that error appears in the above-identified patent and that said Letters Patent is hereby corrected as shown below:

<u>Column 6,</u>
Line 16, delete "indices" and insert -- indicates --.

Signed and Sealed this

Twelfth Day of March, 2002

Attest:

JAMES E. ROGAN
*Attesting Officer*  *Director of the United States Patent and Trademark Office*